United States Patent
Oesten et al.

(10) Patent No.: US 7,384,664 B2
(45) Date of Patent: Jun. 10, 2008

(54) POSITIVE-ELECTRODE ACTIVE MATERIAL FOR NON-AQUEOUS ELECTROLYTE SECONDARY CELL AND PROCESS FOR PREPARING THE SAME

(75) Inventors: Ruediger Oesten, Alsbach (DE); Ryuta Suzuki, Jwaki (JP); Katsuhisa Nitta, Iwaki (JP)

(73) Assignee: Merck Patent GmbH, Darmstadt (DE)

( * ) Notice: Subject to any disclaimer, the term of this patent is extended or adjusted under 35 U.S.C. 154(b) by 667 days.

(21) Appl. No.: 10/510,334

(22) PCT Filed: Feb. 26, 2003

(86) PCT No.: PCT/EP03/01939

§ 371 (c)(1),
(2), (4) Date: Oct. 5, 2004

(87) PCT Pub. No.: WO03/085755

PCT Pub. Date: Oct. 16, 2003

(65) Prior Publication Data

US 2005/0153206 A1  Jul. 14, 2005

(30) Foreign Application Priority Data

Apr. 5, 2002 (JP) ............................. 2002-103764

(51) Int. Cl.
*B05D 5/12* (2006.01)
*H01M 4/58* (2006.01)

(52) U.S. Cl. .................. 427/126.1; 252/182.1
(58) Field of Classification Search ............... 429/224, 429/232; 252/182.1; 427/126.1
See application file for complete search history.

(56) References Cited

U.S. PATENT DOCUMENTS

| | | | |
|---|---|---|---|
| 5,139,901 A | 8/1992 | Kawaguchi et al. | |
| 6,103,416 A | 8/2000 | Baeuerlein et al. | |
| 6,365,299 B1 | 4/2002 | Miyaki et al. | |
| 6,576,215 B1 * | 6/2003 | Numata et al. | 429/224 X |
| 6,916,580 B2 * | 7/2005 | Cho et al. | 429/232 X |
| 2001/0046628 A1 | 11/2001 | Oesten et al. | |

FOREIGN PATENT DOCUMENTS

JP  08-250120  * 9/1996

* cited by examiner

*Primary Examiner*—Stephen J. Kalafut
(74) *Attorney, Agent, or Firm*—Millen, White, Zelano, Branigan, P.C.

(57) ABSTRACT

A positive-electrode active material for non-aqueous electrolyte secondary cells which combine improved discharge property and operational safety, and a process for preparing the same are provided. The positive-electrode active material comprises a base and one or more layers for coating the base, wherein at least one of the layers is a coating layer comprising one or more metallic components and one or more components selected from the group consisting of sulfur, selenium, and tellurium.

6 Claims, No Drawings

POSITIVE-ELECTRODE ACTIVE MATERIAL FOR NON-AQUEOUS ELECTROLYTE SECONDARY CELL AND PROCESS FOR PREPARING THE SAME

DETAILED DESCRIPTION OF THE INVENTION

1. Technical Field of the Invention

The present invention relates to a positive-electrode active material for a non-aqueous electrolyte secondary cell which has good discharge characteristics and improved cycle characteristics while maintaining operational safety, and to a process of preparing the same.

2. Prior Art

Non-aqueous electrolyte secondary cells typified by lithium ion secondary cells are characterized by having larger electromotive forces and lighter weights compared to nickel cadmium secondary cells, nickel hydrogen secondary cells, and the like, and have been widely used in notebook-type computers, video camcorders, and others. Regarding the lithium ion batteries, there is a need for higher capacity, enhanced safety, and lower production cost and, in view of prospective application to electric vehicles, there is a particularly strong demand for safety and cost.

In most currently available lithium ion secondary cells, a material including cobalt is employed as the positive-electrode active material. The secondary cells, which utilize a positive electrode dominantly composed of cobalt, have excellent discharge capacities; however, they have a safety problem in that a leakage or an explosion may occur in a worst case when they are subjected to strong stimulations such as high temperatures, high voltages, over charges, disconnections, and nail pricking. They also have a problem in the high cost of the raw material. As the most potential candidate to solve these problems, manganese based positive-electrode active materials have gained much attention and lithium ion secondary cells utilizing such materials have been already commercialized. However, though lithium ion secondary cells utilizing manganese based positive-electrode active materials have excellent safety characteristics, they have inferior cycle characteristics compared to the cells utilizing cobalt base positive-electrode active materials and therefore have not become mainstream. Their cyclic degradation is more pronounced at high temperatures.

A technique to improve cell properties by exploiting a doping of a foreign element into the positive-electrode active material is disclosed, for example, in JP-A-H03-219571; however, it has not achieved satisfactory performances though it exhibited improvement to some extent. There is disclosed another technique in which a coating layer is applied on the surface of the positive-electrode active material to improve cell properties. Such technique is disclosed in, for example, JP-A-H09-171813, JP-A-H08-236114, JP-A-H08-222219, JP-A-H08-102332, JP-A-H07-288127, JP-A-H09-035715, JP-A-H11-185758, JP-A-2001-313034, WO97-49136, Electrochem. solid-state lett. (1999) p 607, etc., but this technique has not achieved a satisfactory performance either.

PROBLEMS TO BE SOLVED BY THE INVENTION

Accordingly, the object of the present invention is to provide a positive-electrode active material for non-aqueous electrolyte secondary cells which has improved discharge characteristics and good cycle characteristics while maintaining safety and a process for preparing the same.

MEANS FOR SOLVING THE PROBLEMS

The inventors of the present invention have carried out eager investigations to solve the above described problems and, over the course of the investigation, they focused on the point that part of the positive-electrode active material is supposed to be dissolved into the electrolyte and precipitated at the negative electrode thereby changing the electrical potential during repeating charging/discharging cycles, and have found that the stability of the positive-electrode active material is remarkably improved by applying a coating layer containing specific components on the positive-electrode active material thereby preventing the dissolution of the positive-electrode active material and thus the above described problems can be solved, and eventually completed the invention.

Accordingly, the present invention relates to a positive-electrode active material comprising a base and one or more layers for coating said base, wherein at least one of said layers is a coating layer containing one or more kinds of metallic components and one or more components selected from the group consisting of sulfur, selenium, and tellurium.

The present invention also relates to the above described positive-electrode active material, characterized in that the coating layer contains more than two kinds of metallic components.

The present invention further relates to the above described positive-electrode active material, characterized in that the metallic component contained in the coating layer is one or more kinds of components selected from the group consisting of lithium, magnesium, aluminum, silicon, chromium, iron, zirconium, niobium, indium, tungsten, and cerium.

The present invention also relates to the above described positive-electrode active material, characterized in that the base contains manganese component.

The present invention further relates to the above described positive-electrode active material, characterized in that the base has a spinel structure.

The present invention also relates to the above described positive-electrode active material, characterized in that the coating layer contains sulfur component.

The present invention also relates to a non-aqueous electrolyte secondary cell, which utilizes the above described positive-electrode active material.

The present invention further relates to a process for preparing a positive-electrode active material, comprising:
  dispersing a base into water;
  using a raw material containing one or more metallic components and one or more components selected from the group consisting of sulfur, selenium, and tellurium as the coating raw material;
  adding said coating raw material into said dispersion liquid under the control of pH to form a coating layer by a precipitation method; and
  filtering said dispersion liquid followed by drying the same after a coating layer is formed.

The present invention also relates to the above described process for preparing a positive-electrode active material, characterized in that a base containing manganese component is used.

The present invention further relates to the above described process for preparing a positive-electrode active material, characterized in that a base having a spinel structure is used.

The present invention also relates to the above described process for preparing a positive-electrode active material, characterized in that a metallic component containing one or more components selected from the group consisting of lithium, magnesium, aluminum, silicon, chromium, iron, zirconium, niobium, indium, tungsten, and cerium is used.

The present invention further relates to the above described process for preparing a positive-electrode active material, characterized in that a material containing sulfur component is used as the coating raw material. The present invention also relates to the above described process for preparing a positive-electrode active material, characterized in that a raw material containing one or more metallic components is added simultaneously with or in advance to the addition of the raw material containing one or more components selected from the group consisting of sulfur, selenium, and tellurium.

The positive-electrode active material of the present invention is applied with a coating layer containing metallic components and specific components thereby improving its chemical stability and cycle characteristics. Since the positive-electrode active material of the present invention has a coating layer, there is less chance of the contact between the high potential positive-electrode active material and the electrolyte, and therefore the batteries using this material shows high safety under special situations such as overcharges and nail pricking. When a manganese base material is used as the positive-electrode active material, the degradation of cycle characteristics which was a problem in the prior art is improved and a good cycle characteristics is maintained even at high temperatures, and thus a positive-electrode active material having a good cycle characteristics as well as a high level of safety is obtained. Moreover, the positive-electrode active material of the present invention has an excellent suitability for manufacturing such as filterability and therefore enables easy manufacture of the above described positive-electrode active material which has an ensured chemical stability.

EMBODIMENTS OF THE INVENTION

In the present invention, an active material means a component which relates to charging/discharging operation as the principal component generating electric potential in the elements constituting the cell, and includes the active material and the negative-electrode active material. In the present specification, a positive-electrode active material means the whole positive-electrode active material including the coating layer, and a base means the base material for the positive-electrode active material before coating. Moreover, in the present specification, a positive electrode includes a positive-electrode active material, and other than that, includes components such as conductive agents, binders, and additives, which are necessary components to perform charging/discharging.

Metallic components contained in the coating layer of the present invention include alkali metals, alkaline-earth metals, transition metals, semimetals such as Pb and In, and more preferable metallic components are Li, Na, Mg, Al, Si, K, Ca, Ti, V, Cr, Mn, Fe, Co, Ni, Cu, Zn, Y, Zr, Nb, Mo, In, W, and Ce. Any one of these components may be selected, and it is preferable to include more than two components together. Particularly preferable components are Li, Mg, Al, Si, Cr, Fe, Zr, Nb, In, W, Ce, and it is still more preferable to include more than two kinds of these components together.

The raw materials for introducing the metallic components are usable of any materials containing the desired metallic component, including metal alkoxides, fluorides, chlorides, oxychlorides, bromides, iodides, oxides, sulfides, selenides, tellurides, hydroxides, nitrates, sulfates, acetates, salts of organic acids, metal complex, and others.

Excepting metallic components, the components contained in the coating layer of the positive-electrode active material according to the present invention include oxygen, sulfur, selenium, tellurium, and particularly at least one or more components among sulfur, selenium, and tellurium are contained. Particularly, oxygen and sulfur are preferable.

The raw material for introducing components other than metallic components may include sulfur, fluorides, chlorides, bromides, iodides, oxides, sulfide, selenides, tellurides, hydroxides, nitrates, dithionates, disulfites, sulfites, pyrosulfates, sulfates, selenates, tellurates, acetates, and other salts of organic acids. These raw materials may contain metallic components and, in such cases, may be the same material as the raw material for introducing metallic components. Preferable raw materials include sulfide, selenates, tellurates, dithionates, disulfites, sufites, pyrosulfates, sulfates, selenates, and tellurates.

The positive-electrode active material of the present invention may have a plurality of layers if it includes the above described coating layer; preferably the utmost surface layer consists of a coating layer containing the above described components.

The process for forming the coating layer of the present invention may include, for example, baking onto the surface of the active material by heating, electrochemical precipitation on the surface, surface deposition by PVD, CVD, etc., surface deposition by mechanical energy such as strong mixing, and chemical precipitation on the surface, out of which chemical precipitation on the surface is preferable.

As the process of chemical precipitation on the surface, an alkoxide process, a precipitation method, and the like may be used. The alkoxide process may be performed by giving rise to a hydrolysis by adding metal alkoxide raw material, water, and raw material for other necessary components to a liquid formed of the base dispersed in a dispersion medium such as alcohol.

Examples of the precipitation method are (1) a method of adding the base into the liquid in which raw materials containing metallic components and other necessary raw materials are dissolved and if desired, adjusting the pH, and (2) a method of adding the raw material containing the metallic components and raw material containing other necessary components into a liquid formed of the base dispersed in a dispersion medium such as water and if desired, adjusting the pH.

It is preferable to perform the pH adjustment simultaneously with the addition of the raw material containing metallic components and other raw materials. It is also preferable to control the pH to maintain a desired value. The desired value is not necessarily a constant value, and it is to be optimally set throughout the reaction process. The material for controlling the pH may be an aqueous solution of hydrates, ammonia, acetic acid, hydrochloric acid, etc. and the adding rate of these materials need not be constant, and may be varied for pH control. An aqueous solution of lithium hydroxide or ammonia is preferable as the raw material for pH control. The methods of controlling pH include an electrical control method based on a feedback from a pH probe, and a chemical control method based on the addition of a high capacity buffering component.

The range of the set pH value varies depending on the kind of active material which constitutes the base, and the raw materials to be added. When, for example, $Li_{1.05}Ni_{0.42}Mn_{0.53}O_2$ is used for the base, a preferable pH is 7.5 to 9.0 for the case in which the metal containing raw material is iron trichloride, and likewise 7.2 to 8.5 for zinc nitrate, 1.5 to 6.0 for zirconium oxychloride. Further, when $LiMn_2O_4$ is used as the base, a preferable pH is 3.0 to 6.0 for the case in which the metal containing raw material is indium chloride, and likewise 4.0 to 6.0 for the case in aluminum chloride, and 8.0 to 12.0 for the case in sodium aluminate.

The preferable amount of the coating layer in the present invention is 0.1 to 10% by weight with respect to the positive-electrode active material for the base, and more preferably 0.2 to 5%, and still more preferably 0.8 to 3%. The analysis of the components of the coating layer may be conducted in various ways. Examples include an analysis using atomic absorption spectroscopy or ICP by dissolving the specimen, and an analysis by ESCA, SIMS, etc.

The reaction for the surface coating is preferably conducted at a raised temperature; preferably not lower than 30° C. and not higher than 95° C., and more preferably not lower than 40° C. and not higher than 80° C. It is also preferable that the reaction is performed with stirring.

It is preferable to perform filtering after the reaction for the coating is completed. Since, in the coating specimen obtained by the above described reaction, almost all the added coating raw material is consumed for the coating, a good filterability is achieved. Therefore, the above described reaction is preferable in view of the suitability for manufacturing. The filtered coating specimen may be heat treated as desired. The temperature of the heat treatment is preferably not lower than 100° C. and not higher than 750° C., and more preferably not lower than 200° C. and not higher than 500° C.

In the present invention, various positive-electrode active materials may be used as the base for the coating. Depending on the kind of the non-aqueous electrolyte secondary cell to be developed, the base may be formed by using metal oxides, etc. For example, to form a lithium ion non-aqueous electrolyte secondary cell, materials containing metallic component such as Co, Ni, Mn, etc may be used, and more specifically $LiCoO_2$, $LiNiO_2$, $Li_vCo_xNi_yMn_zO_2$ ($0.4 \leq v \leq 1.05$, $0 \leq x \leq 0.20$, $0 \leq y \leq 0.50$, $0.40 \leq z \leq 2.10$) may be mentioned and $LivCoxNiyMnzO_2$ ($0.4 \leq v \leq 1.05$, $0 \leq x \leq 0.20$, $0 \leq y \leq 0.50$, $0.40 \leq z \leq 2.10$) is preferable. In view of the safety, a material containing Mn is preferable and also a material having a spinel structure is preferable.

The negative-electrode active materials which may be used in the present invention include alkaline metals such as lithium, alloys of alkaline metals, carbon materials, and oxides which can occlude and release alkaline metals.

The non-aqueous electrolytic solution which may used in the present invention includes, for example, propylene carbonate, ethylene carbonate, diethyl carbonate, methyl ethyl carbonate, 1,2-dimethoxyethane, 1,2-diethoxyethane, γ-butyrolactone, tetrahydrofuran, 1,3-dioxolane, dipropyl carbonate, diethyl ether, sulfolane, methyl sulfolane, acetonitrile, propyl nitrile, anisole, acetic ester, ester of propionic acid, etch, and any combination of more than two kinds selected from these also may be used.

As the electrolyte to be dissolved in the non-aqueous electrolytic solution, salts of alkaline metals such as lithium and sodium can be used and a proper material is to be selected depending on the kind of the non-aqueous electrolytic solution cell. In the case of, for example, a lithium ion secondary cell, $LiClO_4$, $LiAsF_6$, $LiPF_6$, $LiBF_4$, $LiCF_3SO_3$, $LiN(CF_3SO_2)_2$, $Li[(C_2F_5)_3PF_3]$, etc. may be used, and any of these may also be mixed.

Although there is no limitation on the shape of the non-aqueous electrolyte secondary cell including the positive-electrode active material of the present invention, examples of the shape include, for example, cylindrical shape, square-type, coin-type, button-type, paper-type, etc.

There is also no limitation on the uses of the non-aqueous electrolyte secondary cell, and they may be used in notebook-type computers, mobile phones, video camcorders, digital cameras, portable MDs, portable game machines, portable CD players, back-up power supplies, automobiles, large scale storage batteries, and the like.

EXAMPLES

The present invention will be described in more detail referring to examples, but these will not limit the invention.

Example 1

500 g of water was added to 100 g of $Li_{1.03}Mn_2O_4$ having a spinel structure and being the base of the positive electrode active material with stirring. The temperature of the mixture was regulated at 60° C. and a liquid prepared by dissolving 4.66 g of cobalt chloride hexahydrate and 0.40 g of sodium sulfite into 50 g of water was added thereto while regulating the pH at 8.5 by properly adding 1% aqueous solution of lithium hydroxide. Upon completion of the addition, the mixture was stirred for one more hour and then filtered. The filtered specimen was dispersed in 500 g of water and filtered again and, after repeating this process twice, was dried. The specimen was then heat treated at 450° C. for 30 minutes to obtain the specimen S1 for the example 1. The coating layer contained cobalt, oxygen, and sulfur.

Example 2

500 g of water was added to 100 g of $Li_{1.03}Mn_2O_4$ having a spinet structure and being the base of the positive electrode active material with stirring. The temperature of the mixture was regulated at 45° C. and 1% aqueous solution of acetic acid was added until the pH reached 5.4. Thereafter, a liquid prepared by dissolving 4.73 g of aluminum chloride hexahydrate and 0.56 g of lithium sulfate monohydrate into 50 g of water was added thereto while regulating the pH at 5.4 by properly adding 1% aqueous solution of lithium hydroxide. Upon completion of the addition, the mixture was further stirred for 10 hours and then filtered. The filtered specimen was dispersed in 500 g of water and filtered again and, after repeating this process twice, was dried. The specimen was then heat treated at 290° C. for 30 minutes to obtain the specimen S2 for the example 2. The coating layer contained aluminum, oxygen, and sulfur.

Example 3

500 g of water was added to 100 g of $Li_{1.03}Mn_{1.95}Co_{0.05}O_4$ having a spinel structure and being the base of the positive electrode active material with stirring. The temperature of the mixture was regulated at 75° C. and a liquid prepared by dissolving 3.92 g of ferrous chloride tetrahydrate and 0.20 g of sodium sulfite into 50 g of water was added thereto while regulating the pH at 8.3 by properly adding 1% ammonium aqueous solution. Upon completion of the addition, the mixture was further stirred for one hour and then filtered. The filtered specimen was dispersed in 500 g of water and filtered again and, after repeating this process twice, was dried. The specimen was then heat treated at 450° C. for 20 minutes to obtain the specimen S3 for the example 3. The coating layer contained iron, oxygen, and sulfur.

Example 4

500 g of water was added to 100 g of $Li_{1.03}Mn_{1.95}Co_{0.05}O_4$ having a spinel structure and being the base of the positive electrode active material with stirring. The temperature of the mixture was regulated at 60° C. and a liquid prepared by dissolving 2.67 g of zinc chloride and 0.20 g of sodium sulfite into 50 g of water was added thereto while regulating the pH at 7.5 by properly adding 1% ammonium aqueous solution. Upon completion of the addition, the mixture was further stirred for 3 hours and then filtered. The filtered specimen was dispersed in 500 g of water and filtered again and dried. The specimen was then heat treated at 480° C. for 20 minutes to obtain the specimen S4 for the example 4. The coating layer contained zinc, oxygen, and sulfur.

Example 5

500 g of water was added to 100 g of $Li_{1.03}Mn_2O_4$ having a spinet structure and being the base of the positive electrode active material, and 1.10 g of lithium acetic anhydride with stirring. The temperature of the mixture was regulated at 60° C. and a liquid prepared by dissolving 4.66 g of cobalt chloride hexahydrate and 0.40 g of sodium sulfite into 50 g of water was added thereto while regulating the pH at 8.5 by properly adding 1% aqueous solution of lithium hydroxide. Upon completion of the addition, the mixture was stirred for one more hour and then filtered. The filtered specimen was dispersed in 500 g of water and filtered again and, after repeating this process twice, was dried. The specimen was then heat treated at 450° C. for 30 minutes to obtain the specimen S5 for the example 5. The coating layer contained cobalt, lithium, oxygen, and sulfur.

Example 6

500 g of water was added to 100 g of $Li_{1.03}Mn_2O_4$ having a spinel structure and being the base of the positive electrode active material with stirring. The temperature of the mixture was regulated at 45° C. and a liquid prepared by dissolving 1.10 g of lithium acetate into 50 g of 1.5% aqueous solution of acetic acid was added thereto while regulating the pH at 5.4 by properly adding 1% aqueous solution of lithium hydroxide. Upon completion of the addition, the mixture was further stirred for 10 hours and then filtered. The filtered specimen was dispersed in 500 g of water and filtered again and, after repeating this process twice, was dried. The specimen was then heat treated at 290° C. for 30 minutes to obtain the specimen S6 for the example 6. The coating layer contained aluminum, lithium, oxygen, and sulfur.

Example 7

500 g of water was added to 100 g of $Li_{1.03}Mn_2O_4$ having a spinel structure and being the base of the positive electrode active material with stirring. The temperature of the mixture was regulated at 45° C. and 1% aqueous solution of acetic acid was added until the pH reached 5.3. Thereafter, a liquid prepared by dissolving 4.26 g of aluminum chloride hexahydrate, 0.58 g of indium chloride tetrahydrate, and 0.21 g of lithium sulfate monohydrate into 50 g of water was added thereto while regulating the pH at 5.3 by properly adding 1% aqueous solution of lithium hydroxide. Upon completion of the addition, the mixture was further stirred for 10 hours and then filtered. The filtered specimen was dispersed in 500 g of water and filtered again and, after repeating this process twice, was dried. The specimen was then heat treated at 290° C. for 30 minutes to obtain the specimen S7 for the example 7. The coating layer contained aluminum, indium, oxygen, and sulfur.

Example 8

500 g of water was added to 100 g of $Li_{1.03}Mn_2O_4$ having a spinel structure and being the base of the positive electrode active material with stirring. The temperature of the mixture was regulated at 45° C. and 1% aqueous solution of acetic acid was added until the pH reached 5.8. Thereafter, a liquid prepared by dissolving 4.26 g of aluminum chloride hexahydrate, 0.47 g of cobalt chloride hexahydrate, and 0.20 g of sodium sulfite into 50 g of water was added thereto while regulating the pH at 5.8 by properly adding 1% aqueous solution of lithium hydroxide. Upon completion of the addition, the mixture was further added with the 1% aqueous solution of lithium hydroxide to raise its pH to 8.5, and was stirred for 3 hours and then filtered. The filtered specimen was dispersed in 500 g of water and filtered again and, after repeating this process twice, was dried. The specimen was then heat treated at 290° C. for 30 minutes to obtain the specimen S8 for the example 8. The coating layer contained aluminum, cobalt, oxygen, and sulfur.

Example 9

The specimen S9 for the example 9 was prepared in an analogous fashion with the example 8 except that $Li_{1.05}Ni_{0.42}Mn_{0.53}O_2$ was used as the base for the positive electrode active material. The coating layer contained aluminum, cobalt, oxygen, and sulfur.

Example 10

The specimen S10 for the example 10 was prepared in an analogous fashion with the example 8 except that $LiCoO_2$ was used as the base for the positive electrode active material. The coating layer contained aluminum, cobalt, oxygen, and sulfur.

Example 11

500 g of water was added to 100 g of $Li_{1.03}Mn_2O_4$ having a spinel structure and being the base of the positive electrode active material with stirring. The temperature of the mixture was regulated at 45° C. and 1% aqueous solution of acetic acid was added thereto until its pH reached 5.3. Thereafter, a liquid prepared by dissolving 0.52 g of chromium trichloride hexahydrate into 10 g of water was added thereto while regulating the pH at 5.3 by properly adding 1% aqueous solution of lithium hydroxide. The mixture was added with the 1% aqueous solution of lithium hydroxide until its pH reached 5.8, and thereafter a liquid prepared by dissolving 4.26 g of aluminum chloride hexahydrate, 0.47 g of cobalt chloride hexahydrate, and 0.20 g of sodium sulfite into 50 g of water was added thereto while regulating the pH at 5.8 by properly adding 1% aqueous solution of lithium hydroxide. Upon completion of the addition, the mixture was further added with the 1% aqueous solution of lithium hydroxide to raise its pH to 8.5, and was stirred for 3 hours and then filtered. The filtered specimen was dispersed in 500 g of water and filtered again and, after repeating this process twice, was dried. The specimen was then heat treated at 290° C. for 30 minutes to obtain the specimen S11 for the example 11. The coating layer contained aluminum, cobalt, chromium, oxygen, and sulfur.

Example 12

500 g of water was added to 100 g of $Li_{1.03}Mn_2O_4$ having a spinel structure and being the base of the positive electrode active material, with stirring. The temperature of the mixture was regulated at 45° C. and 1% aqueous solution of acetic acid was added until the pH reached 5.3. Thereafter, a liquid prepared by dissolving 0.73 g of cerium trichloride heptahydrate into 10 g of water was added thereto while regulating the pH at 5.3 by properly adding 1% aqueous solution of lithium hydroxide. The mixture was added with the 1% aqueous solution of lithium hydroxide until its pH reached 5.8, and thereafter a liquid prepared by dissolving 4.26 g of aluminum chloride hexahydrate, 0.47 g of cobalt chloride hexahydrate, and 0.20 g of sodium sulfite into 50 g of water was added thereto while regulating the pH at 5.8 by properly adding 1% aqueous solution of lithium hydroxide. Upon completion of the addition, the mixture was further added with the 1% aqueous solution of lithium hydroxide to raise its pH to 8.5, and was stirred for 3 hours and then filtered. The filtered specimen was dispersed in 500 g of water and filtered again and, after repeating this process twice, was dried. The specimen was then heat treated at 290° C. for 30 minutes to obtain the specimen S12 for the example 12. The coating layer contained aluminum, cobalt, cerium, oxygen, and sulfur.

Example 13

500 g of water was added to 100 g of $Li_{1.03}Mn_2O_4$ having a spinel structure and being the base of the positive electrode active material, and 0.20 g of sodium sulfite with stirring. The temperature of the mixture was regulated at 45° C. and 1% aqueous solution of acetic acid was added until the pH reached 5.8. Thereafter, a liquid prepared by dissolving 4.26 g of aluminum chloride hexahydrate, and 0.47 g of cobalt chloride hexahydrate into 50 g of water was added thereto while regulating the pH at 5.8 by properly adding 1% aqueous solution of lithium hydroxide. Upon completion of the addition, the mixture was further added with the 1% aqueous solution of lithium hydroxide to raise its pH to 8.5, and was stirred for 3 hours and then filtered. The filtered specimen was dispersed in 500 g of water and filtered again and, after repeating this process twice, was dried. The specimen was then heat treated at 290° C. for 30 minutes to obtain the specimen S13 for the example 13. The coating layer contained aluminum, cobalt, oxygen, and sulfur.

Comparative Example 1

The specimen R1 for the comparative example 1 was prepared in an analogous fashion with the example 1 except that sodium sulfite was not added. The coating layer contained cobalt and oxygen.

Comparative Example 2

The specimen R2 for the comparative example 2 was prepared in an analogous fashion with the example 2 except that lithium sulfate monohydrate was not added. The coating layer contained aluminum and oxygen.

Comparative Example 3

The specimen R3 for the comparative example 3 was prepared in an analogous fashion with the example 3 except that sodium sulfite was not added. The coating layer contained iron and oxygen.

Comparative Example 4

The specimen R4 for the comparative example 4 was prepared in an analogous fashion with the example 4 except that sodium sulfite was not added. The coating layer contained zinc and oxygen.

Comparative Example 5

The specimen R5 for the comparative example 5 was prepared in an analogous fashion with the example 5 except that sodium sulfite was not added. The coating layer contained cobalt, lithium, and oxygen.

Comparative Example 6

The specimen R6 for the comparative example 6 was prepared in an analogous fashion with the example 6 except that lithium sulfate monohydrate was not added. The coating layer contained aluminum, lithium, and oxygen.

Comparative Example 7

The specimen R7 for Comparative example 7 was prepared in an analogous fashion with the example 8 except that sodium sulfite was not added. The coating layer contained aluminum, cobalt, and oxygen.

Comparative Example 8

The specimen R8 for the comparative example 8 was prepared in an analogous fashion with the example 9 except that sodium sulfite was not added. The coating layer contained aluminum, cobalt, and oxygen.

Comparative Example 9

The specimen R9 for the comparative example 9 was prepared in an analogous fashion with the example 10 except that sodium sulfite was not added. The coating layer contained aluminum, cobalt, and oxygen.

Chemical Stability Test

The stability test was conducted by investigating the amount of dissolution of manganese or cobalt into acetic acid while the coating specimen was immersed in a 1000 ppm aqueous solution of acetic acid. The amount of dissolution of manganese into the aqueous solution of acetic acid are measured for the specimens other than S10 and R9 and the amount of dissolution of cobalt was measured for the specimens S10, R9 by means of a component absorption photometry. The chemical stability test was also conducted on the base specimens having no coating, and the amount of dissolution of each coated specimen was represented by a relative quantity of dissolution of each specimen having coating to the base specimen having no coating as the reference 100. In this measure, smaller figures show higher stability.

Manufacturing Suitability Test

According to the process of the present invention, the manufacturing suitability of the coating of the positive electrode active material will be improved. One of these features is improved filterability. The evaluation was conducted on the first filtering step in the process of preparing each coating specimen and the filtration speed was represented by 5 steps such that the fastest filtration speed is 5, and the slowest is 1.

TABLE 1

| Specimen | | Base Positive Electrode | Coating layer composition | Chemical stability | Filtration speed |
|---|---|---|---|---|---|
| Present Inv. | S1 | 1 | Co, S, O | 75 | 3 |
| Present Inv. | S2 | 1 | Al, S, O | 65 | 4 |
| Present Inv. | S3 | 2 | Fe, S, O | 65 | 5 |
| Present Inv. | S4 | 2 | Zn, S, O | 70 | 5 |
| Present Inv. | S5 | 1 | Li, Co, S, O | 75 | 3 |
| Present Inv. | S6 | 1 | Li, Al, S, O | 50 | 4 |
| Present Inv. | S7 | 1 | Al, In, S, O | 45 | 5 |
| Present Inv. | S8 | 1 | Al, Co, S, O | 40 | 5 |
| Present Inv. | S9 | 3 | Al, Co, S, O | 70 | 5 |
| Present Inv. | S10 | 4 | Al, Co, S, O | 85 | 5 |
| Present Inv. | S11 | 1 | Al, Co, Cr, S, O | 30 | 5 |
| Present Inv. | S12 | 1 | Al, Co, Ce, S, O | 30 | 5 |
| Present Inv. | S13 | 1 | Al, Co, S, O | 60 | 5 |
| Comp. Example | R1 | 1 | Co, O | 95 | 1 |
| Comp. Example | R2 | 1 | Al, O | 90 | 1 |
| Comp. Example | R3 | 2 | Fe, O | 90 | 2 |
| Comp. Example | R4 | 2 | Zn, O | 95 | 2 |
| Comp. Example | R5 | 1 | Li, Co, O | 95 | 1 |
| Comp. Example | R6 | 1 | Li, Al, O | 90 | 1 |
| Comp. Example | R7 | 1 | Al, Co, O | 90 | 1 |
| Comp. Example | R8 | 3 | Al, Co, O | 90 | 1 |
| Comp. Example | R9 | 4 | Al, Co, O | 95 | 1 |

The base positive electrodes are:
1: $Li_{1.03}Mn_2O_4$,
2: $Li_{1.03}Mn_{1.95}Co_{0.05}O_4$,
3: $Li_{1.05}Ni_{0.42}Mn_{0.53}O_2$,
4: $LiCoO_2$.

As shown in Table 1, the specimens according to the present invention is good in the chemical stability and the filterability compared to the comparative examples. Moreover, among the specimens according to the present invention, the specimens S5 to S8 which contained more than two kinds of metals in their coating layers showed better chemical stability compared to the specimens S1 and S2.

Also the comparison between the specimens S8 to S10 and the specimens R7 to R9 showed that positive-electrode active materials, other than lithium manganate having a spinel structure, used as the base proved some effects of the present invention, but the extents of improvement were rather small.

The specimens S11 and S12, on which multiple-layer coating was applied, showed greater effects in the improvement of the chemical stability compared to the specimen S8 having a single layer coating.

The specimen S13 according to the present invention, in which the raw material containing sulfur was added prior to the addition of metal raw materials, showed reduced chemical stability compared to the specimen S8 in the case of simultaneous addition of both raw material containing sulfur and the metal raw materials.

The specimens in which sulfur was replaced with selenium or tellurium showed similar effects, but the degrees of the improvement were smaller compared to the specimens including sulfur.

Coin Type Battery Test 91 wt % of the specimen Si, 6 wt % of polyvinylidene fluoride, and 3 wt % of acetylene black were mixed and dispersed in N-methyl-pyrrolidone. Then the mixture was applied on a aluminum foil of a 20 μm thickness and dried, and the coated foil was compressed by a roller press machine and thereafter stamped to form a disc of a 13 mm diameter thus obtaining a positive-electrode formed on the aluminum foil. This was placed in a positive-electrode retainer. 85 wt % of graphite powder, 12 wt % of polyvinylidene fluoride, and 3 wt % of acetylene black were mixed and was dispersed in N-methyl-pyrrolidone. Then the mixture was applied on a copper foil of a thickness of 20 μm and dried, and the coated foil was compressed by a roller press machine and thereafter stamped to form a disc of 13 mm diameter thus obtaining a negative-electrode formed on the copper foil. This electrode was placed in a negative-electrode retainer. An electrolyte was formed by dissolving a 1 mol/l concentration of $LiPF_6$ into the liquid formed by mixing propylene carbonate and diethyl carbonate by a volume ratio of 1/1. This electrolyte was injected into the positive-electrode retainer in which the specimen was placed, and a separator made of polypropylene was placed thereon. Then the positive-electrode retainer and negative-electrode retainer were joined and sealed with a caulking machine to form a coin battery CS1.

The coin batteries CS2 to CS13 were prepared by using the specimens S2 to S13 instead of the specimen S1 used in the coin battery CS1.

The coin batteries CR1 to CR9 were prepared by using the specimens R1 to R9 instead of the specimen S1 used in the coin battery CS1.

The coin batteries CB1 to CB4 were prepared by using the base positive-electrodes 1 to 4 in place of the specimen S1 used in the coin battery CS1.

These coin batteries were charged and discharged under conditions of a temperature of 60° C., a charge current of 2 mA, a terminal charge voltage of 4.2 V, a discharge current of 2 mA, and a terminal discharge voltage of 3.0 V. The ratio of the discharge capacity after 50 cycles with respect to that of the first cycle is evaluated as a holding ratio of capacity.

TABLE 2

| Coin Battery | Holding ratio of Capacity (%) 60° C. |
|---|---|
| CS1 | 77 |
| CS2 | 82 |
| CS3 | 82 |
| CS4 | 80 |
| CS5 | 78 |
| CS6 | 85 |
| CS7 | 87 |
| CS8 | 88 |
| CS9 | 80 |
| CS10 | 75 |
| CS11 | 90 |
| CS12 | 90 |
| CS13 | 84 |
| CR1 | 62 |
| CR2 | 55 |
| CR3 | 56 |
| CR4 | 61 |

TABLE 2-continued

| Coin Battery | Holding ratio of Capacity (%) 60° C. |
|---|---|
| CR5 | 62 |
| CR6 | 50 |
| CR7 | 53 |
| CR8 | 55 |
| CR9 | 69 |
| CB1 | 30 |
| CB2 | 41 |
| CB3 | 52 |
| CB4 | 68 |

ADVANTAGES OF THE INVENTION

The positive-electrode active materials of the present invention is good (superior) in chemical stability and manufacturing suitability, and the non-aqueous electrolyte secondary cells of the present invention is good (superior) in cycle characteristics.

The invention claimed is:

1. A process for preparing a positive-electrode active material, comprising:
   dispersing a base into water;
   using a raw material containing: one or more metallic components; and one or more components selected from the group consisting of sulfur, selenium, and tellurium, as a coating raw material;
   adding said coating raw material into dispersion liquid containing the base under the control of pH to form a coating layer on the base by a precipitation method; and
   filtering said dispersion liquid followed by drying the coated base.

2. The process for preparing a positive-electrode active material according to claim 1, wherein a material containing manganese is used as the base.

3. The process for preparing a positive-electrode active material according to claim 1, wherein a material having a spinel structure is used as the base.

4. The process for preparing a positive-electrode active material according to claim 1, wherein a material containing one or more of lithium, magnesium, aluminum, silicon, chromium, iron, zirconium, niobium, indium, tungsten, or cerium is used as the metallic component.

5. The process for preparing a positive-electrode active material according to claim 1, wherein a material containing sulfur is used as the coating raw material.

6. The process for preparing a positive-electrode active material according to claim 1, wherein a raw material containing one or more metallic components is added simultaneously with or in advance to the addition of the raw material containing one or more of sulfur, selenium, or tellurium.

* * * * *